United States Patent [19]

Larrabee et al.

[11] Patent Number: 5,602,333

[45] Date of Patent: Feb. 11, 1997

[54] APPARATUS FOR MEASURING THE LEVEL OF A LIQUID IN A TANK

[75] Inventors: David A. Larrabee, Downingtown; John S. Wyler, Berwyn; Farid Ahmad, Collegeville, all of Pa.

[73] Assignee: Smiths Industries, Malvern, Pa.

[21] Appl. No.: 261,844

[22] Filed: Jun. 17, 1994

[51] Int. Cl.$^6$ .............................. G01F 17/00; G01F 23/00
[52] U.S. Cl. ...................... 73/149; 73/304 R; 73/304 C; 73/290 R; 324/681; 324/690; 340/620
[58] Field of Search .................... 73/304 R, 304 C, 73/149, 290 R; 340/620; 361/284; 324/675, 681, 682, 690; 364/509, 550, 560, 576

[56] References Cited

U.S. PATENT DOCUMENTS

| 3,058,345 | 10/1962 | Mastras | 73/290 R |
|---|---|---|---|
| 3,096,591 | 7/1963 | Higgins, Jr. et al. | 324/682 |
| 3,140,608 | 7/1964 | Clark | 73/304 C |
| 3,199,350 | 8/1965 | Schubring | 73/304 C |
| 3,582,921 | 6/1971 | Krieger | 340/182 |
| 3,651,505 | 3/1972 | Schmidt | 340/200 |
| 4,090,408 | 5/1978 | Hedrick | 73/304 C |
| 4,173,893 | 11/1979 | Hedrick | 73/304 C |
| 4,176,553 | 12/1979 | Wood | 73/304 C |
| 4,428,232 | 1/1984 | Tanaka et al. | 73/304 C |
| 4,434,657 | 3/1984 | Matsumura et al. | 73/304 C |
| 4,449,405 | 5/1984 | Franz et al. | 73/304 C |
| 4,451,894 | 5/1984 | Dougherty et al. | 364/509 |
| 4,487,066 | 12/1984 | Pardi et al. | 73/304 C |
| 4,559,507 | 12/1985 | Ramsdale et al. | 331/183 |
| 4,731,730 | 3/1988 | Hedrick et al. | 364/509 |
| 4,872,120 | 10/1989 | Orloff et al. | 364/509 |
| 4,908,783 | 3/1990 | Maier | 364/566 |
| 4,912,976 | 4/1990 | Labriola, II | 73/290 R |
| 4,918,619 | 4/1990 | Orloff et al. | 364/509 |
| 4,996,656 | 2/1991 | Hedrick | 364/558 |
| 5,078,010 | 1/1992 | Lock | 73/304 R |
| 5,142,909 | 9/1992 | Baughman | 73/304 C |
| 5,150,062 | 9/1992 | Takeuchi | 324/675 |
| 5,165,084 | 11/1992 | Chang | 361/284 |
| 5,270,210 | 12/1993 | Weyrauch et al. | 73/863.32 X |
| 5,359,541 | 10/1984 | Pope et al. | 364/497 |

FOREIGN PATENT DOCUMENTS

| 231152 | 11/1968 | U.S.S.R. | 324/675 |
|---|---|---|---|
| 1010450 | 4/1983 | U.S.S.R. | 324/675 |
| 2025623 | 1/1980 | United Kingdom | 73/304 C |

OTHER PUBLICATIONS

Chen, Wai–Kai. Passive and Active Filters. N.Y., John Wiley & Sons, 1986, p. 12.
Lindeburg, Michael R., PE. Engineer–in–Training Reference Manual, CA, Professional Publications, Inc., 1992, p. 51–15. 1992.

Primary Examiner—Richard Chilcot
Assistant Examiner—Paul D. Amrozowicz
Attorney, Agent, or Firm—Howson and Howson

[57] ABSTRACT

A fuel gauging system for use in determining the level of fuel in a tank. The system incorporates a resonant circuit for measuring the resonant frequency of at least one probe immersed in the fuel located in the tank. From measurements of variations of the frequency of resonance, the level of liquid in the tank is determined, and the fuel quantity is then calculated and displayed.

13 Claims, 6 Drawing Sheets

5,602,333

APPARATUS FOR MEASURING THE LEVEL OF A LIQUID IN A TANK

FIELD OF THE INVENTION

The present invention relates to a system for measuring the level of a liquid in a tank, and more particularly, the present invention relates to an aircraft fuel tank gauging system using resonant probes in a frequency-responsive circuit.

BACKGROUND OF THE INVENTION

For safety and economic reasons, aircraft must have the capability of determining accurately the amount of fuel on board. Federal regulations determine the minimum amount of fuel which an aircraft must carry because unexpected events may alter the course and destination of the aircraft. In these situations it is important to have an accurate measurement of fuel remaining to enable the craft to be flown safely to an alternate destination.

The amount of fuel to be carried by an aircraft is determined by a variety of considerations, such as payload, route, weather, etc. The heavier the fuel load, the less payload an aircraft can carry. Therefore, accurate on-board fuel gauging equipment is commercially desirable because it allows less fuel to be carried for a given route, resulting in a more economic flight operation.

Conventional fuel gauging systems have used capacitance probes located in the tanks of aircraft. Generally, such probes consist of two concentric vertically-disposed electrodes defining a space in which fuel rises during filling and lowers during consumption. The level of the fuel within the probe alters the capacitance value of the probe. The capacitance of the probe varies linearly with the fuel level within the probe. Therefore, an electrical signal applied to the probe can be used to determine a probe capacitance value at a given fuel level. This capacitance value can then be used to determine the quantity of fuel in the tank.

One such commercially available fuel system is known as the Summed Characterized Probe System. In this system, each probe has a longitudinal capacitance characteristic tailored to match the specific fuel tank characteristics at each fuel level. The diameter of the inner electrode of the probe is altered longitudinally by various processes, such as swaging. All of the probes located in the tank are then electronically summed to provide a signal that is proportional to total fuel quantity in the tank. This system has the advantage of requiring minimal wiring, and the required electronics are relatively simple. However, a drawback of the system is that the probes are expensive to manufacture, and upon probe failure, the entire system can become inoperable. With this system, it is very difficult to achieve fuel quantity determinations with a high degree of accuracy and still maintain a robust mechanical design.

A second type of commercially available fuel gauging system is known as the Individually Addressed Linear Probe System. In this type system, the capacitance of each probe is measured individually. Each probe is linear, i.e. the diameters of inner and outer electrodes remain constant throughout the length of the probe. Therefore, the probes are relatively inexpensive to manufacture. The integrity of each individual probe is monitored to detect probe failure; however, with such a system, there is an increased complexity of the monitoring electronics and wiring. The additional wiring adds to the weight and cost of the system, and reduces system reliability. The electronics are more complicated because each probe must be driven separately in order to achieve a reasonable system response to fuel level changes. This added complexity makes such a system expensive, and it also reduces system reliability.

One example of a prior art capacitative fuel gauging system is disclosed in U.S. Pat. No. 4,918,619. The '619 patent suggests using a junction probe to multiplex the outputs from several probes and transmit the results in digital format to appropriate readout displays. The disadvantage of this system is that there are active electronic components in the tank. In addition, a substantial amount of electronics is required, and this can lead to reliability problems.

Prior art fuel gauging systems all rely on the same basic principle of capacitance measurement. As discussed, these represent a trade-off between performance and cost. Although various fuel gauging systems of the prior art may function satisfactorily for their intended purposes, there is a need for a more accurate fuel gauging system which meets performance objectives while minimizing weight and cost.

OBJECTS OF THE INVENTION

With the foregoing in mind, the primary object of the present invention is to provide a novel fuel gauging system which can accurately measure the fuel contained in the tank of an aircraft.

Another object of the present invention is to provide an improved fuel gauging system that is both inexpensive to manufacture and that has a minimum of wiring thereby enabling it to be installed efficiently.

A further object of the present invention is to provide a fuel gauging system that has the ability to self-detect a probe malfunction.

A still further object of the present invention is to provide a dependable fuel gauging system which can operate satisfactorily in a typical high performance aircraft environment under adverse conditions such as electromagnetic interference and wide variations in ambient temperatures.

SUMMARY OF THE INVENTION

More specifically, the present invention provides apparatus which is particularly suited for measuring the level of fuel in an aircraft fuel tank. To this end, at least one probe is disposed in the fuel tank for at least partial immersion in the fuel. Means are electronically coupled to the probe for providing a resonant circuit which defines a resonant frequency. The resonant frequency is a function of the fuel level in the tank.

A generator applies electric input signals to the probe resonant circuit. The system includes means for determining the probe resonant frequency. There is also means coupled to the output to compute and display the fuel level in the tank, whereby the quantity of fuel in the tank can be determined from the resonant frequency measurement.

The resonant circuit includes a probe comprising a capacitor and an inductor. The capacitor and inductor are connected in series. The capacitor has a capacitance which is a function of the fuel level within the probe. The resonant frequency is a function of both the fixed inductance and the variable capacitance caused by variations in fuel level.

Preferably, the probe comprises an inner tube and an outer tube concentric with one another to form a capacitive air gap there between. The inner and outer tubes are disposed vertically relative to the fuel tank, and the inner and outer tubes are spaced apart from one another to allow fuel to flow there between. The inductor is carried within the inner capacitor tube of the probe.

Preferably, a plurality of probes are mounted in each fuel tank and are connected in electrical parallel relation. Each probe is designed to operate within a prescribed resonant frequency range. The resonant frequency ranges of the probes are different so they do not overlap in the normal course of operation.

An advantage of the system is that it enables frequency values to be determined by means of conventional digital electronics to accomplish the objects noted above.

BRIEF DESCRIPTION OF THE DRAWINGS

The foregoing and other objects, features and advantages of the present invention should become apparent from the following description when taken in conjunction with the accompanying drawings, in which.

DETAILED DESCRIPTION OF THE PREFERRED EMBODIMENT

Figure 1:
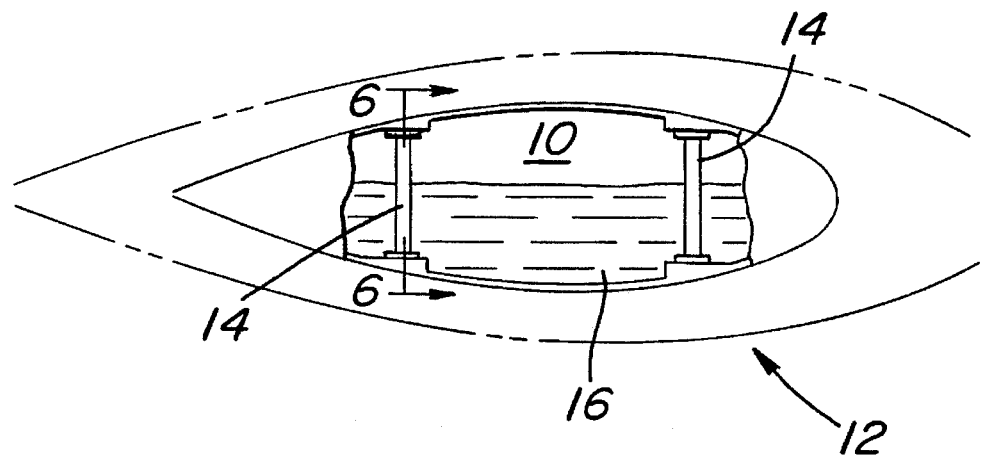
FIG. 1 is a schematic cross-sectional view in reduced scale of a fuel tank located in the wing of an aircraft and having two fuel level probes.

Referring now to the drawings, FIG. 1 illustrates schematically a portion of a fuel tank 10 located in the wing 12 of a typical aircraft. A series of probes 14, in the illustration two in number, extend transverse to the normal direction of fuel level movement, or vertically, within the fuel tank 10 in spaced fore and aft relation. In a conventional capacitive system, an electronic signal would be applied to the probes for producing an output signal which is a function of the level of the fuel 16 in the probe. The measured level of the fuel 16 enables the amount of fuel carried in the tank to be calculated in a known manner and displayed.

Figure 2:
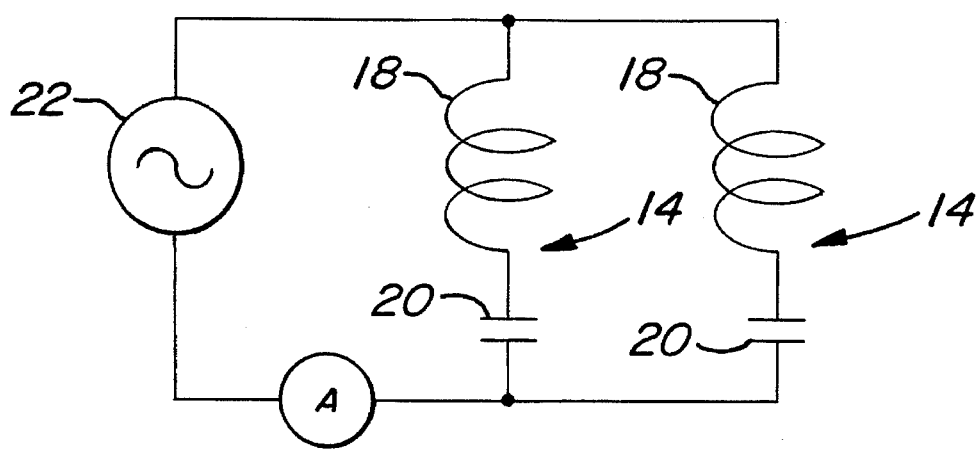
FIG. 2 is a simplified circuit diagram illustrating the theoretical underpinnings of one embodiment of the fuel gauging system of the present invention.

In the present invention, the probes 14 incorporate inductors with capacitors to form a resonant circuit which functions to measure fuel quantity in a novel manner to be described. To this end, as shown in FIG. 2, each probe 14 has an inductor 18 connected in series with a capacitor 20 to form a series inductive-capacitance (LC) resonant circuit. As the fuel level changes, the probe capacitance changes, and this changes the resonant frequency of the probe. A simplified schematic diagram of one embodiment of the system is illustrated in FIG. 2.

Figure 8:
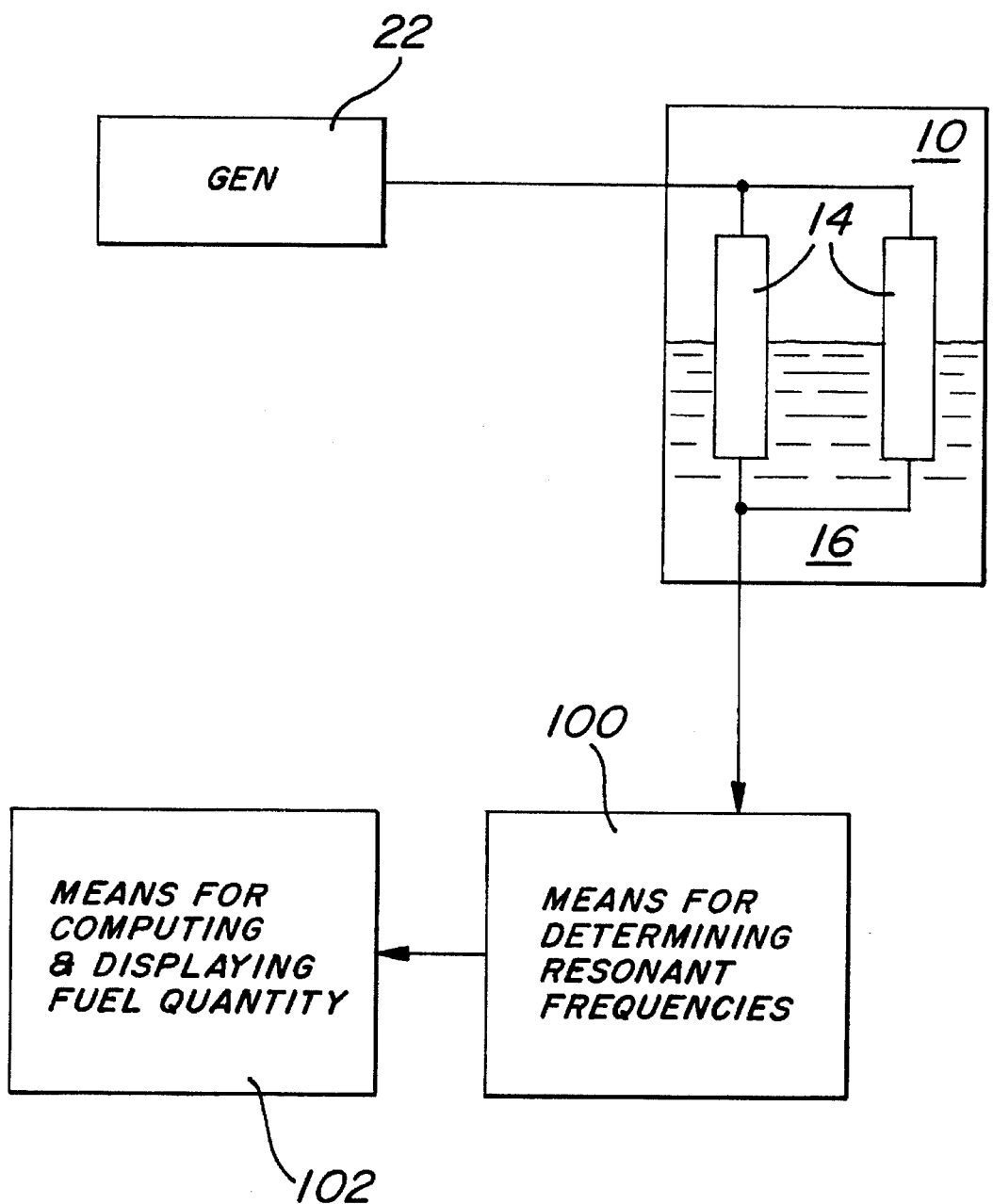
FIG. 8 is a simplified block diagram of the fuel gauging system of the present invention.

For the sake of simplicity, the block diagram of FIG. 8 is provided to illustrate the theoretical underpinnings of a novel fuel gauging system that multiplexes several resonant probes on a single pair of wires. As seen therein, a generator 22 applies an electric input signal to several multiplexed resonant probes 14. A means 100 receives the response of the multiplexed probes 14 to the input signal and determines the resonant frequency of each probe. A means 102 is provided with sufficient information about the resonant frequency determination to compute and display the quantity of fuel in a tank.

As shown, a generator 22 applies voltages at predetermined discrete frequencies to the probes 14 of the fuel gauging system. The current through each probe is measured. Since the current is at a maximum only during resonance of each individual probe, the resonant frequency of the fuel-immersed probe can be readily determined. By using several probes operating within different resonant frequency ranges, the probes can be connected in parallel and their output will not interfere with each other since their peak output currents will occur at different input frequencies.

Figure 4:
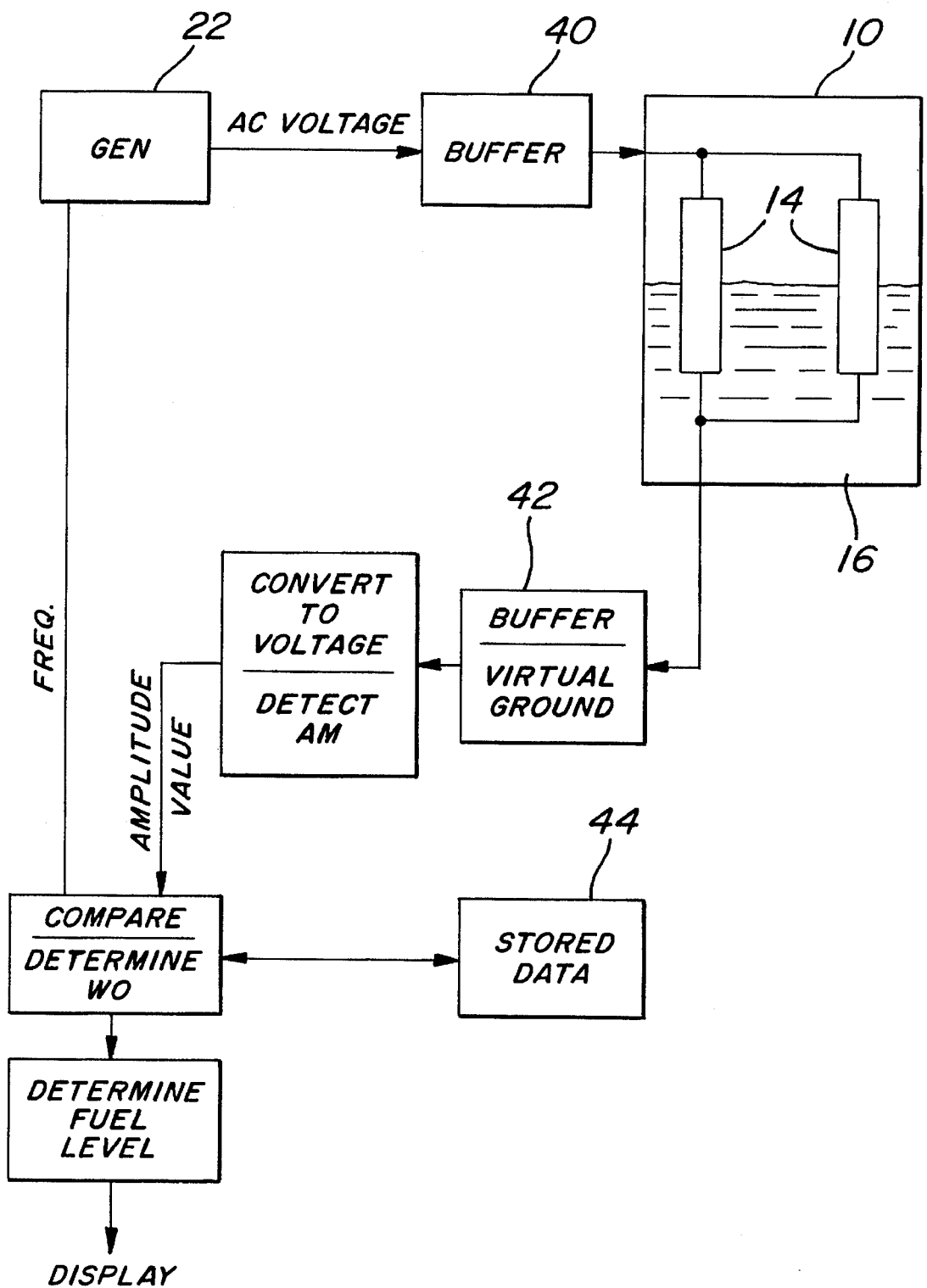
FIG. 4 is a block diagram of one embodiment of the fuel gauging system of the present invention.

The block diagram shown in FIG. 4 illustrates in a functional manner the fuel gauging system of the present invention. The generator 22 produces alternating current (AC) voltages at predetermined frequencies. These voltages are applied to the probes 14 which are located in the fuel tank 10 and which are immersed to various levels. Circuit buffers, 40 and 42, are located on the tank wall at the input and output ends of the probes to maintain the electrical cable length as short as possible and to provide a low drive impedance. The output end of each probe 14 is maintained at virtual ground by the receiver electronics in the tank wall buffer 42. The probe current is converted to a voltage and amplitude-modulation (AM) detected. Data concerning the resonant frequency of the probes at various levels of fuel is stored in a random access memory component (RAM) 44. This data is used in conjunction with the frequency data of the input signal, and the amplitude of the output signal, to determine the resonant frequency of each probe. The resonant frequency provides the fuel level, and therefore, enables the amount of fuel contained in the fuel tank to be calculated. The data is converted into a signal which drives a cockpit display indicative of fuel quantity.

Figure 5:
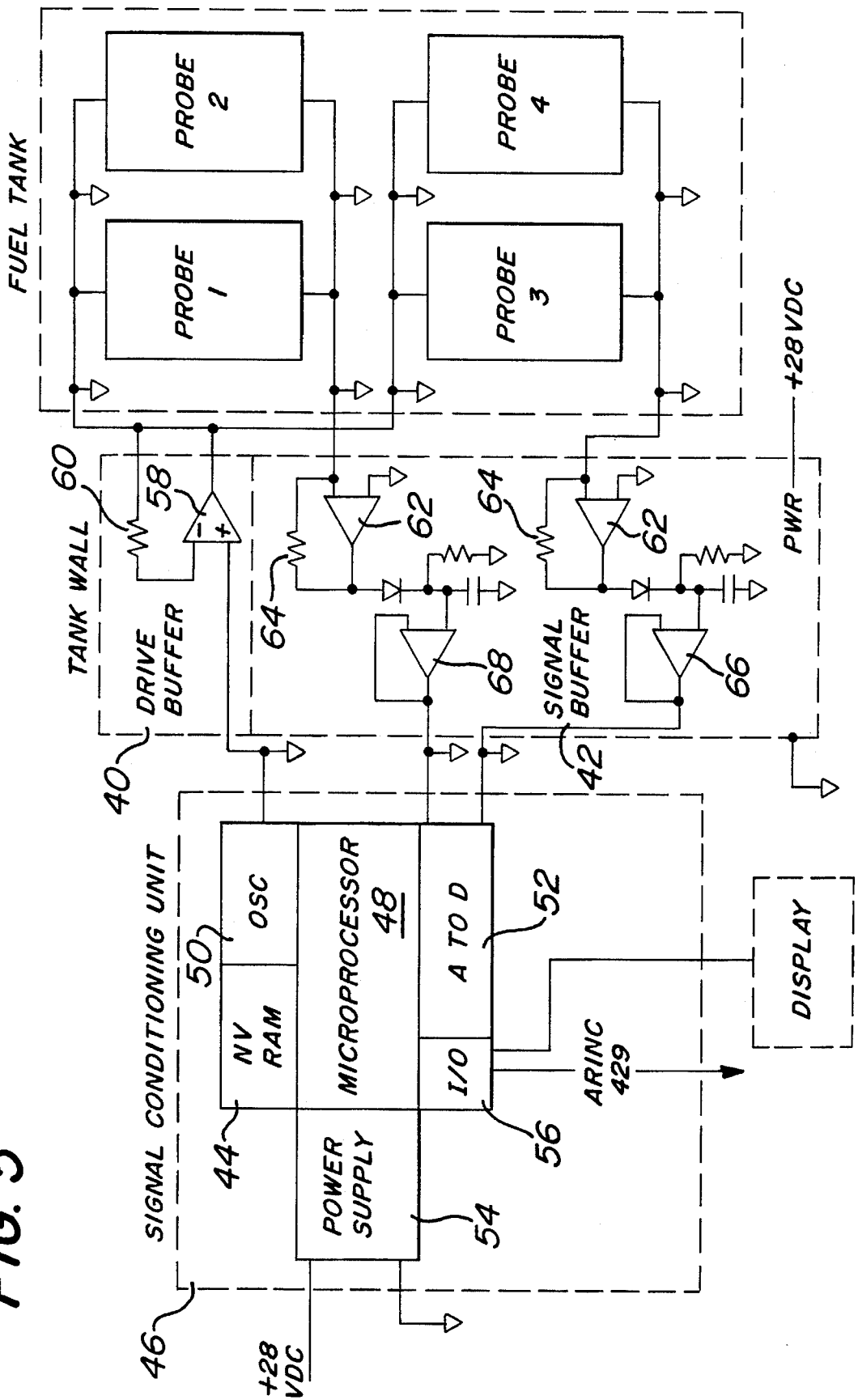
FIG. 5 is a block diagram of the system of the present invention.

FIG. 5 illustrates more specifically the fuel gauging system of the present invention. As best seen there, the signal conditioning unit 46 consists of a microprocessor 48, a programmable oscillator 50, an analog-to-digital (A/D) converter 52, a non-volatile (RAM) 44, a power supply 54, and means 56 for communicating the fuel quantity to the cockpit I/O, and to other systems on the airplane. The microprocessor 48 controls the oscillator 50 which generates an AC voltage with an amplitude of approximately 0.1 volt at a frequency in a range of between about 250 KHz to about 2 MHz. The voltage signal is applied to the tank wall drive buffer 40.

A factor that can limit performance of this system is the resonances in the cables connecting the various electronic components. To ameliorate this, the tank wall drive buffer 40 makes the best use of available cable by placing the so-called "electrical start" of the cable at the tank. As shown in FIG. 5, the buffer consists of one operational amplifier 58 per line going into the tank, and at least one resistor 60.

The resonant probes 14 are mounted in a substantially vertical position in the fuel tank such that they are immersed to various depths by the fuel contained in the tank. Each probe is characterized by a different resonant frequency. The probes are multiplexed on the same two wires, thereby enabling weight, cost and in-tank structure to be minimized.

The probe current is measured by using so-called virtual ground circuitry. In this circuitry, the output ends of the probes are maintained at virtual electrical ground by the tank wall signal buffer electronics 42. The operational amplifiers 62 adjust their outputs by virtue of the negative feedback through their resistors so that their inputs have an equal potential. The probe current must flow through the feedback resistor 64 since the operational amplifier itself draws very little current. This creates a voltage drop across the resistor which appears as the output voltage. Since the negative input of the operational amplifier is at a potential of zero volts, it is at ground electrical potential.

The output of the amplifier oscillates at the same frequency as the initial input signal. The tank wall signal buffer electronics 42 includes an integrator 66 which provides the value of the peak amplitude of the signal.

The output signal coming from the tank wall buffer is transmitted back to the signal conditioning unit 46. The signal conditioning unit receives a set of direct current (DC) signals in response to its alternating current (AC) transmission. The DC signals are feed into an analog to digital convertor 52. The system varies the frequency of the input voltage and analyzes the response contained in the DC signals. A plot of the DC voltage obtained, versus the frequency of the AC voltage transmitted into the probes, will contain a single peak for each probe in the tank at its resonant frequency. See FIG. 3. As the amount of fuel fills the probe, its capacitance changes, which lowers the frequency of the peak, i.e. the resonant frequency. The shift in frequency from a full to an empty probe is approximately 30 percent.

As discussed heretofore, the resonant frequency of the probe is determined by the level of the fuel within the probe. Thus, for a given probe, the resonant frequency is in a range which varies from a fully-immersed probe to an empty probe. Input signals having frequencies outside of this range will result in substantially no output signal from the probe. This enables several probes to be connected in electrical parallel relation with the first probe. Since each probe has a different resonant frequency range which varies between the fully-immersed and empty state, by designing the probes so that none of the ranges overlap, the outputs from multiple probes will not interfere with one another.

Figure 3:
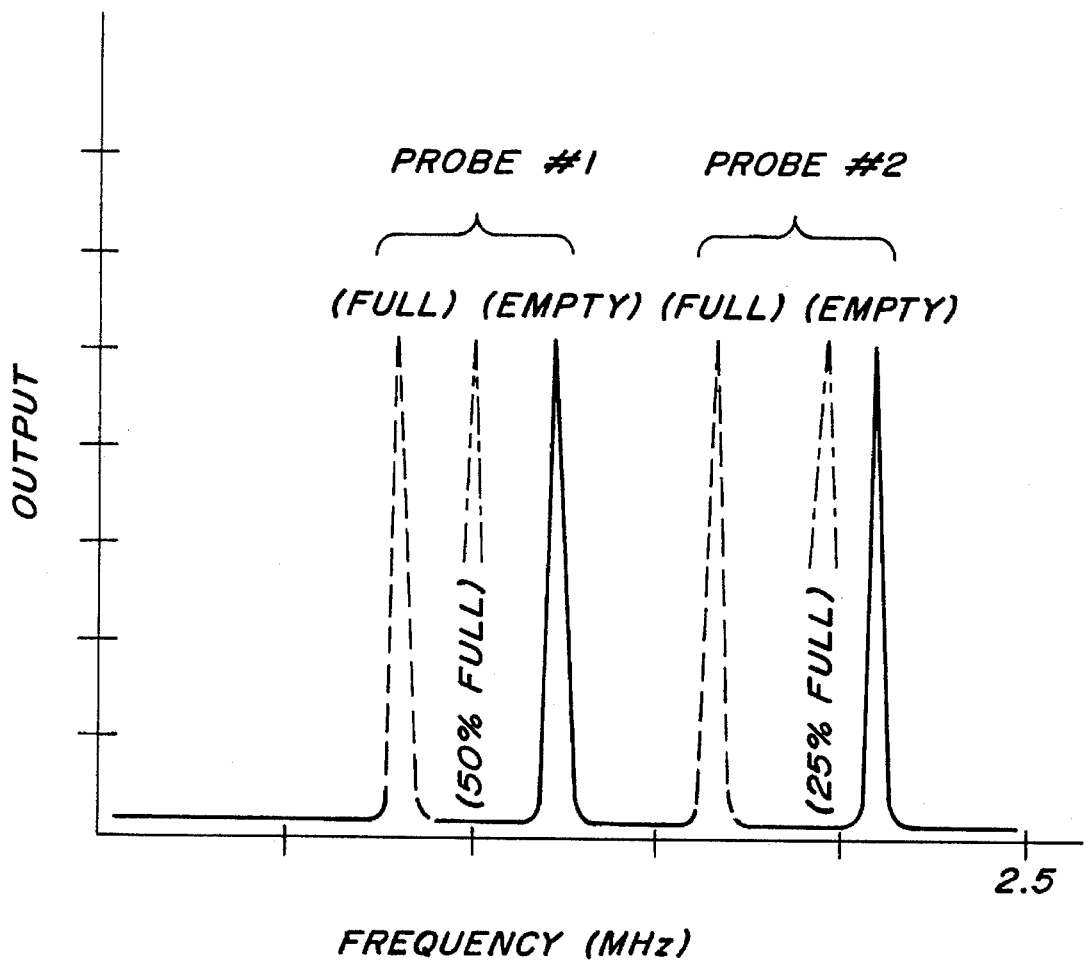
FIG. 3 is a plot illustrating the ranges of peak output at the resonant frequencies of the two probes.

FIG. 3 illustrates schematically the ranges of resonant frequencies of two parallel connected probes. Note that probe No. 1's resonant frequency will vary between the dotted line peak output corresponding to a fully immersed probe, and the empty probe peak output. Probe No. 2 has a similar range. The range of Probe No. 1 resonant frequencies does not overlap into the range of Probe No. 2 resonant frequencies. The appropriate values of inductance and capacitance are chosen to ensure this relationship.

By electronically storing several key parameters of the frequency spectrum when the probes are dry, the system can be calibrated to accommodate manufacturing tolerances. For instance, as the resistance of the circuit changes, the peaks in the probe become broader. Measurements of the peak width enable probe malfunction, or failure, to be detected.

Stored data located in the RAM 44 is accessed by the microprocessor 48 to compare the input frequencies with the DC signals applied to the A/D converter 52. The microprocessor 48 is capable of determining the fuel level in the tank through a comparison of these values. A signal is then communicated and displayed at a remote location, such as in the cockpit of an airplane.

Figure 6:
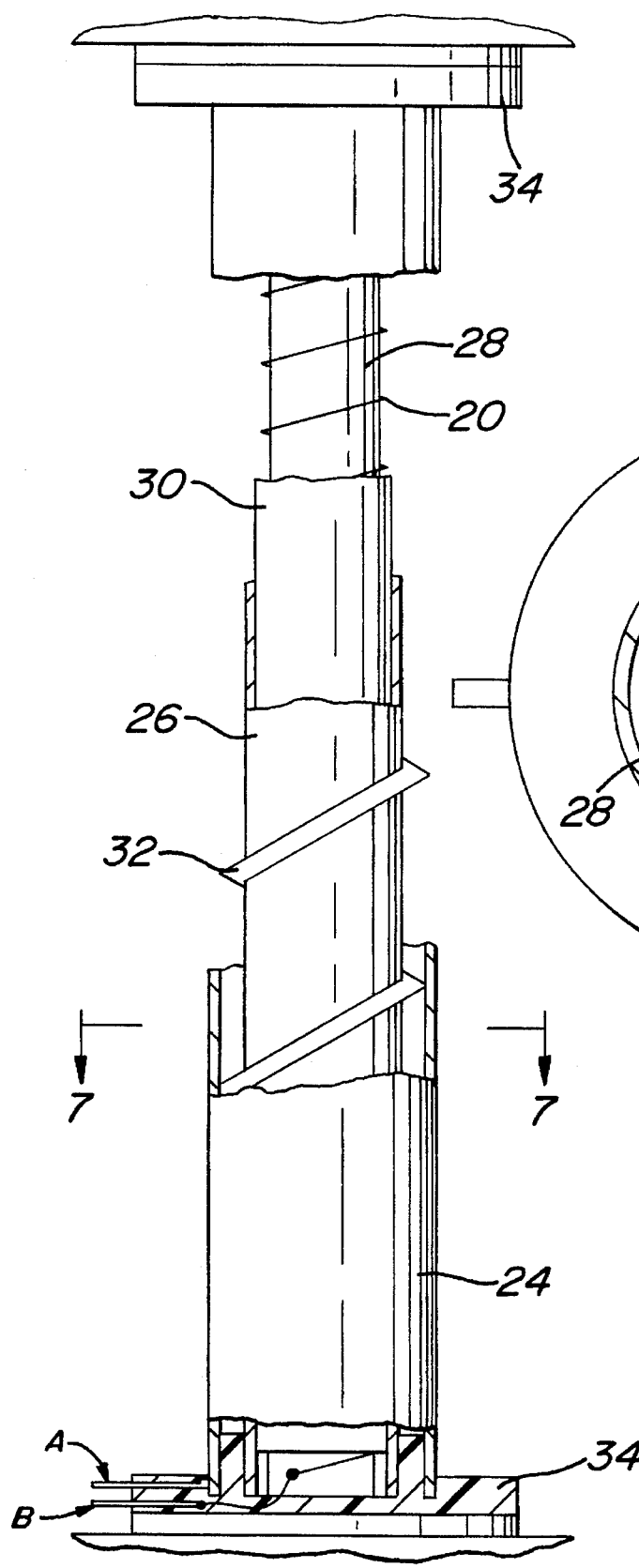
FIG. 6 is an enlarged, partially-cutaway view of a simplified version of the resonant probe taken along line 6—6 of FIG. 1.
Figure 7:
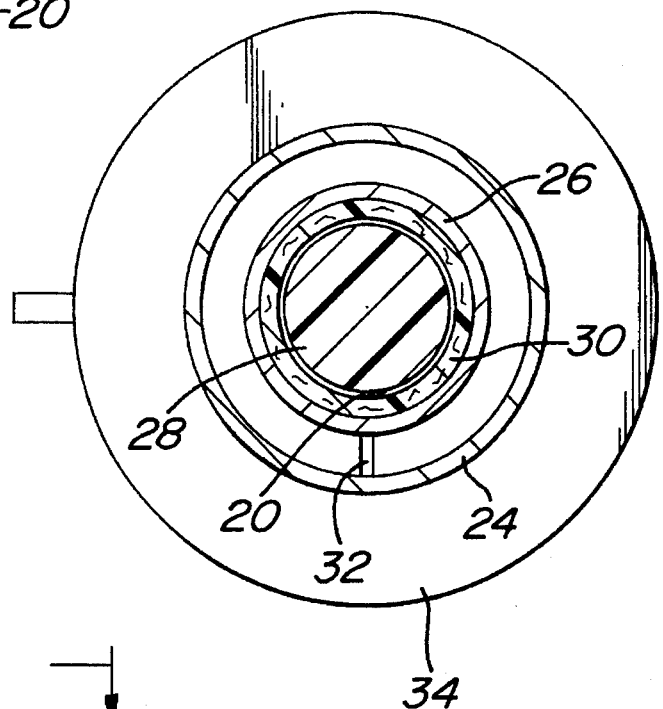
FIG. 7 is a cross-sectional view of the probe taken along line 7—7 of FIG. 5.

The probes used in the fuel gauging system are simple structures which are straightforward to manufacture. To this end, the fuel probe 14, see FIG. 6 and FIG. 7, has concentric outer and inner aluminum alloy electrodes, 24 and 26, respectively, forming an elongate cylindrical capacitive air gap between them. An inductor 20 is located inside the inner electrode 26. The drive voltage is applied to the outer electrode 24 at connection "A" (FIG. 6). The inner tube 26 contains the inductor 20 which is connected to the top of the inner tube 26 and then to the return signal line at connection "B".

Preferably, the inductor 20 is fabricated of resistance wire wound on a solid nylon rod 28 reinforced with a thirty percent (30%) glass fiber fill. The resistance wire is needed to add electrical loss to the circuit to widen the resonance peak (lower Q). This makes peak detection easier for the signal conditioning unit. About 10 ohms of resistance is required. Alternatively, the inductor could be constructed from copper wire and a discrete resistor added to the circuit. The inductor 20 is encapsulated with an electrically non-conductive material 30 which separates it electrically from the inner tube 26 except for the location where it is electrically connected thereto.

In the illustrated embodiment, the co-axial spatial relationship between the inner and outer tubes, 26 and 24, respectively is maintained either by means of an electrically non-conductive fluoro-polymer spline 32, or by a series of spacer buttons (not shown). Preferably, the air gap is about 0.2 inch. Relative rotational and axial movement between the two tubes is prevented by means of a floro-polymer rod (not shown) passing diametrically through both tubes 24, 26 and the inductor 20.

The probe is fitted with a molded plastic end cap assembly 34 which protects the probe ends and wiring during installation and supports the inductor 20 inside the inner tube 26. The probes and end caps have sufficient venting and draining capabilities (not shown) to insure that rapid fuel level changes do not result in significant differences between the fuel levels inside and outside the probe. Moreover, the caps are designed so that air and water traps cannot be formed as well known in the art.

The probe design provides a strong structure capable of withstanding a 50 pound tensile force applied directly to the probe unit. This structure, coupled with the airframe mounting brackets, is capable of withstanding the effects of dynamic loading associated with fuel slosh waves generated within a fuel tank.

The values of capacitance and inductance can vary. By way of example, probes can have a capacitance when empty of between 48 and 192 pico-Farads (pF) and a capacitance when full of liquid of 96 to 384 pF. The inductor can have a inductance of 141 to 824 micro-Henry (mH). These parameters provide a empty resonant frequency of between 1.935 and 0.4 MHz, and a full resonant frequency ranging from 1.368 to 0.283 MHz with typical jet fuel "A" in the space between the inner and outer capacitive tubes.

The above described fuel gauging system provides a number of advantages. For instance, it provides more accurate fuel level measurements than prior art systems. The probes used in it have a simple linear construction which is straightforward to manufacture. A plurality of probes can be connected in parallel on the same two wires to enable a minimum of wiring to be utilized, and tank penetration of ancillary electronics is kept to a minimum. Frequency determinations are straightforward to accomplish utilizing digital electronics. As a result, the electronics are simple and reliable requiring no precision analog circuitry. In addition, the system provides a ready means of detecting probe failure.

Various embodiments of the invention for providing a fuel gauging system that multiplexes several resonant probes on a single pair of wires are possible. For instance, an electrical pulse signal, or white noise excitation signal, which contains a spectrum of frequencies, can be applied to the multiplexed probes. Each probe responds to such a signal by resonating at its characteristic frequency corresponding to the fuel level in the tank. The output of the probes can be electrically analyzed to determine the individual resonant frequency of each probe. This can be accomplished by Fourier analysis which is capable on commercially available high speed DSP chips.

While a preferred embodiment of the fuel gauging system has been described, various modifications, alterations and changes may be made without departing from spirit and scope of the invention as defined in appended claims.

We claim:

1. Apparatus for measuring the level of a liquid in a tank comprising:

at least one probe disposed in the tank for at least partial immersion in the liquid;

means electrically coupled to said probe for providing a resonant circuit defining a resonant frequency, said resonant frequency being a function of the level of immersion of the probe by the liquid in the tank;

a generator for applying an electrical input signal to said probe resonant circuit;

means for determining said probe resonant frequency;

means electrically coupled to said probe resonant frequency determining means for computing and displaying the quantity of said liquid in said tank; and at least another probe disposed in said tank and connected in electrical parallel relation with said at least one probe, each probe connected in said resonant circuit having a distinct resonant frequency corresponding to a predetermined liquid level in the tank, and each probe resonant frequency lying within a range of frequencies which do not overlap with one another between maximum and minimum probe immersion conditions;

whereby the quantity of liquid in the tank can be determined from said resonant frequency measurement.

2. Apparatus according to claim 1, wherein said resonant circuit includes a capacitor and an inductor connected in series.

3. Apparatus according to claim 2, wherein said probe has a capacitance which is a function of its depth of immersion in the liquid, and wherein said resonant frequency is a function of said capacitance.

4. Apparatus according to claim 3, wherein said capacitor and said inductor are provided in said probe.

5. Apparatus according to claim 4, wherein said capacitor comprises an inner tube and an outer tube concentric with one another and disposed transversely relative to changes in liquid level in the tank, and wherein said inductor is carried within said inner tube of said capacitor.

6. Apparatus according to claim 5, including means for spacing said inner and outer tubes apart along their lengths, and means for preventing said tubes from rotating relative to one another.

7. Apparatus according to claim 5, wherein said inductor includes a wire wrapped helically around an electrically-insulated tube encapsulated in a electrically non-conductive material and surrounded by said inner tube of said capacitor.

8. Apparatus for measuring the level of a liquid in a tank comprising:

a plurality of probes disposed in the tank for at least partial immersion in the liquid;

means electrically coupled to each probe for providing a series LC resonant circuit defining a distinct resonant frequency, said resonant frequency being a function of the level of immersion of the probe in the liquid;

means connecting said series LC resonant circuits in electrical parallel relation, said LC resonant circuits being operable in ranges of resonance which do not overlap one another;

a generator for applying electrical input signals at selected ones of different frequencies to said probe resonant circuits;

means for determining said probe resonant frequencies; and means electrically coupled to said probe resonant frequency determining means for comparing stored resonant frequencies with known liquid levels and computing and displaying the quantity of said liquid in said tank;

whereby the quantity of liquid in the tank can be determined from said resonant frequency measurements.

9. Apparatus according to claim 8 wherein said ranges of resonance of the probes correspond to ranges of immersion of the probes in the liquid between minimum and maximum conditions of immersion.

10. Apparatus according to claim 9 wherein said probe includes elongate electrically conductive elements extending alongside one another in spaced relation to form a capacitive gap therebetween, and an inductor carried by one of said elements for cooperating therewith to form said LC circuit.

11. In an aircraft having a fuel tank, apparatus for measuring the level of fuel in the tank comprising:

a plurality of probes disposed in the tank for at least partial immersion in the fuel;

each probe including an elongate air gap capacitor and an inductor associated with it for providing an LC resonant circuit defining a distinct resonant frequency, said resonant frequency being a function of the level of fuel in the air gap;

means connecting said LC resonant circuits of each probe in electrical parallel relation, said LC resonant circuits operable in ranges of resonance which do not overlap one another in their normal course of operation;

a generator for applying electrical input signals at selected ones of different frequencies to said probe resonant circuits;

means for determining said probe resonant frequencies; and means electrically coupled to said probe resonant frequency determining means for comparing stored resonant frequencies with known fuel levels in the tank and computing and displaying the fuel quantity in said tank;

whereby the fuel level in the tank and hence quantity of fuel can be determined from said resonant frequency measurements.

12. Apparatus according to claim 8, wherein each of said plurality of probes comprises:

an elongate capacitor assembly having an inner tube and an outer tube, said inner and outer tubes being of electrically conductive material and being concentric with each other;

spacer means for providing a gap between said inner and outer tubes along their lengths for admitting liquid therebetween;

an elongate inductor connected in series with said inner tube of said capacitor assembly, said inductor being of electrically-conductive material wrapped helically around an electrically insulated core;

a layer of electrical insulating material surrounding said inductor on the inside of said inner tube of said capacitor assembly; and said inductor being substantially coextensive in length with said inner tube of said capacitor assembly.

13. Apparatus according to claim 12 wherein the capacitance of said capacitor assembly is in a range of between about 48 and 192 pF in the absence of liquid between the tubes and in a range of between about 96 to about 384 pF when full of liquid between the tubes; where the inductor has an inductance in a range about 141 to about 824 mH, to provide a resonant frequency in the absence of liquid in a range of 1.935 to 0.4 MHz and a resonant frequency in a range of 1.368 to 0.283 MHz when full of liquid.

* * * * *